US006879989B2

(12) United States Patent
Cheng et al.

(10) Patent No.: US 6,879,989 B2
(45) Date of Patent: Apr. 12, 2005

(54) MODIFICATION SYSTEM FOR SUPPORTING LOCALIZED DATA CHANGES IN A MOBILE DEVICE

(75) Inventors: Josephine Miu Cheng, San Jose, CA (US); Jyh-Herng Chow, San Jose, CA (US); Thanh Tan Pham, San Jose, CA (US); HongHai Shen, San Jose, CA (US); I-Shin Andy Wang, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 210 days.

(21) Appl. No.: 09/375,260

(22) Filed: Aug. 16, 1999

(65) Prior Publication Data

US 2002/0161735 A1 Oct. 31, 2002

(51) Int. Cl.[7] .............................................. B06F 17/30
(52) U.S. Cl. ........................................ 707/201; 707/10
(58) Field of Search ............................. 707/1, 10, 2, 3, 707/201, 203, 8, 200, 101

(56) References Cited

U.S. PATENT DOCUMENTS

| 5,781,910 A | 7/1998 | Gostanian et al. .......... 707/201 |
| 5,845,292 A | 12/1998 | Bohannon et al. .......... 707/202 |
| 5,864,849 A | 1/1999 | Bohannon et al. ............. 707/8 |
| 5,870,743 A | 2/1999 | Cohen et al. .................. 707/8 |
| 5,870,761 A | 2/1999 | Demers et al. ............. 707/201 |
| 5,870,765 A | 2/1999 | Bauer et al. ................ 707/203 |
| 5,884,327 A | 3/1999 | Cotner et al. ............... 707/202 |
| 5,907,848 A | 5/1999 | Zaiken et al. ............... 707/202 |
| 5,924,094 A | 7/1999 | Sutter .......................... 707/10 |
| 5,978,842 A | * 11/1999 | Noble et al. ................. 709/218 |
| 6,023,698 A | * 2/2000 | Lavey, Jr. et al. ............ 707/10 |
| 6,073,141 A | * 6/2000 | Salazar ....................... 707/204 |
| 6,131,096 A | * 10/2000 | Ng et al. ....................... 707/10 |
| 6,141,664 A | * 10/2000 | Boothby et al. ............. 707/201 |
| 6,151,606 A | * 11/2000 | Mendez ...................... 707/201 |
| 6,157,927 A | * 12/2000 | Schaefer et al. ............ 707/103 |

OTHER PUBLICATIONS

Panagos et al., Client–Based Logging for High Performance Distributed Architectures, Proceedings of the 12th International Conf. on Data Engineering, pp. 344–351, Feb. 1996.*

* cited by examiner

*Primary Examiner*—Greta Robinson
(74) *Attorney, Agent, or Firm*—Gates & Cooper LLP

(57) ABSTRACT

A method, apparatus, and article of manufacture for a computer implemented modification system for supporting localized data changes in a computer. A change is executed to data in a computer having a local database. The change is performed by the computer to modify data in the local database stored within a data storage device at the computer. The change is indicated as being global. When the local database on the computer is synchronized with a main database on another computer, only global changes are transmitted from the local database to the main database.

42 Claims, 5 Drawing Sheets

MODIFICATION SYSTEM FOR SUPPORTING LOCALIZED DATA CHANGES IN A MOBILE DEVICE

BACKGROUND OF THE INVENTION

1. Field of the Invention

This invention relates in general to a computer implemented database system, and more particularly, to a modification system for supporting localized data changes in a mobile device.

2. Description of Related Art

Databases are computerized information storage and retrieval systems. A Relational Database Management System (RDBMS) is a database management system (DBMS) which uses relational techniques for storing and retrieving data. Relational databases are organized into tables which consist of rows and columns of data. The rows are formally called tuples. A database will typically have many tables and each table will typically have multiple tuples and multiple columns. The tables are typically stored on random access storage devices (RASD) such as magnetic or optical disk drives for semi-permanent storage.

RDBMS software using a Structured Query Language (SQL) interface is well known in the art. The SQL interface has evolved into a standard language for RDBMS software and has been adopted as such by both the American National Standards Institute (ANSI) and the International Standards Organization (ISO). The SQL interface allows users to formulate relational operations on the tables either interactively, in batch files, or embedded in host languages, such as C and COBOL. SQL allows the user to manipulate the data. A variety of mobile devices such as Palm, Windows CE devices, various embedded systems, and smart card based systems, may utilize a local database management system for storing and retrieving data. Sometimes, relational database management systems are utilized. These types of mobile devices have become very popular and are increasingly being used by a wide spectrum of people. Unfortunately, these small devices have limited memory, a small display, and operate at slow speeds. Also, these small devices occasionally need to connect to a main database, via a slow and expensive network data link, to download and upload information.

Most of the time, a user utilizes a mobile device in stand-alone mode (i.e. when its not connected to the main database). For example, a salesperson may download information from the main database in the morning about prospective buyers, such as their business addresses, use the mobile device during the day in stand-alone mode, and the next morning download information about another set of prospective buyers. When the mobile device connects to the main database, the data in the RDBMS of the mobile device is synchronized with the data in the RDBMS of the main database. During synchronization, changes in the databases of either the mobile device or the main database, are reconciled with one another, such that they are synchronized (i.e. contain the same data).

Due to the small display and limited memory of mobile devices, a user may want to delete some of the data on the mobile device. Further, a user may want to make some changes to the data on the mobile device, such as to delete unnecessary information about a potential buyer or to make specialized notes about a potential buyer, that do not need to be reflected at the main database. Unfortunately, any data changes (deletions/changes/insertions) made with the mobile device will be detected when it is connected with the main database during the synchronization process. This unnecessarily increases the amount of data transmitted back and forth during the synchronization process resulting in a slow, inefficient, and expensive synchronization process. Thus, there is a need in the art for an improved method of making changes to data in a mobile device.

SUMMARY OF THE INVENTION

To overcome the limitations in the prior art described above, and to overcome other limitations that will become apparent upon reading and understanding the present specification, the present invention discloses a method, apparatus, and article of manufacture for a computer implemented modification system for supporting localized data changes in a computer.

In accordance with the present invention, a change is executed to data in a computer having a local database. The change is performed by the computer to modify data in the local database stored within a data storage device at the computer. The change is indicated as being global. When the local database on the computer is synchronized with a main database on another computer, only global changes are transmitted from the local database to the main database.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and which is shown by way of illustration a specific embodiment in which the invention may be practiced. It is to be understood that other embodiments may be utilized as structural changes may be made without departing from the scope of the present invention.

Hardware Environment

Figure 1:
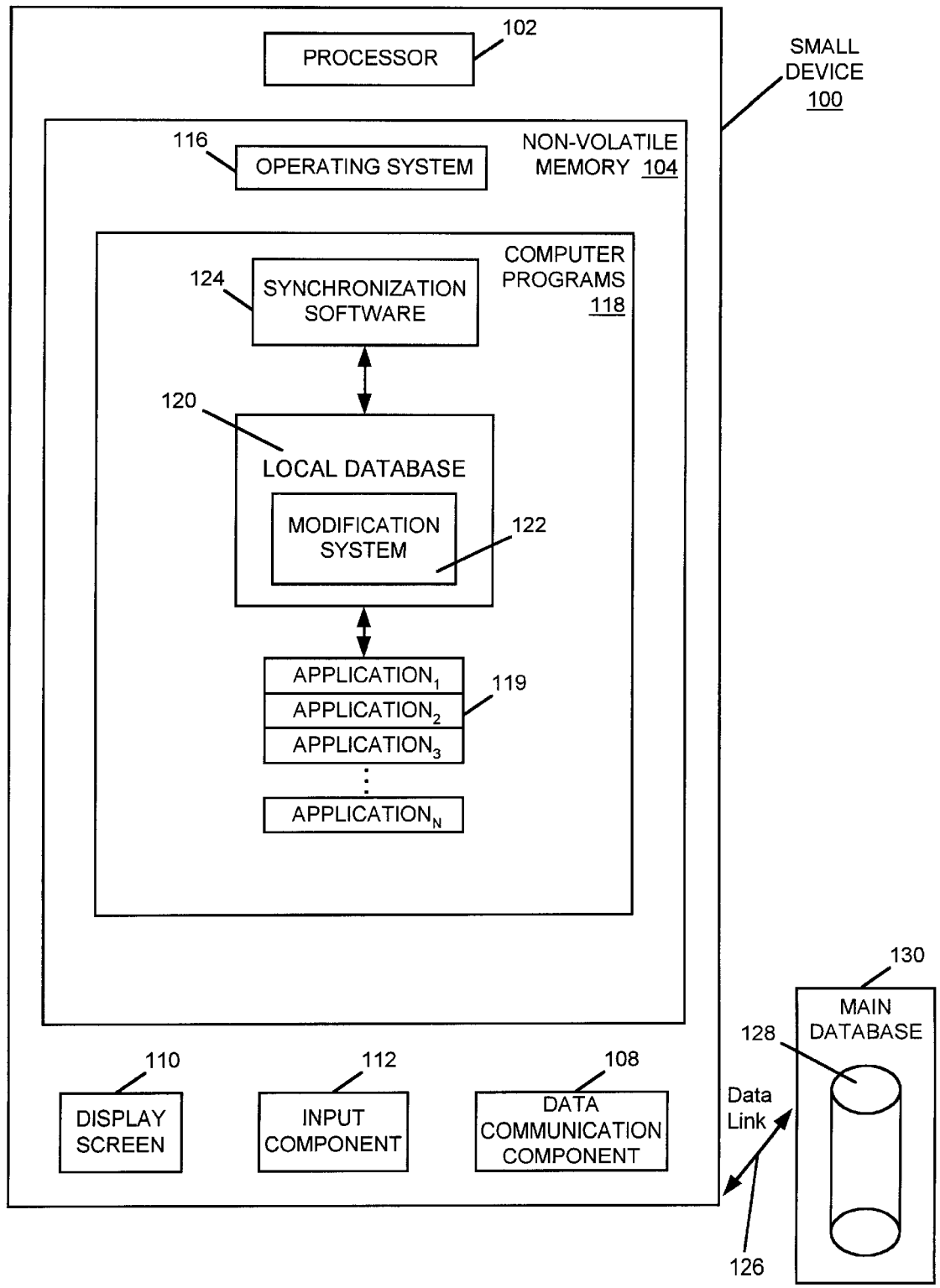
FIG. 1 is an exemplary hardware environment used to implement a preferred embodiment of the invention.

FIG. 1 is an exemplary hardware environment used to implement the preferred embodiment of the invention. The present invention is typically implemented in a small mobile computer device 100. These small mobile computer devices 100 are typically handheld computers designed for mobile workers who need portable handheld computing devices for database applications in inventory, shipping, sales, and healthcare, and are also used by the general populace. A variety of such handheld computers, such as Palm, Windows CE devices, various embedded systems, and smart card based systems, are widely available. These mobile devices may utilize a local database management system or a local relational database management system (RDBMS), such as the DB2® Everywhere product sold by the IBM Corporation. As previously discussed, these types of data systems are useful for storing and retrieving data.

These small mobile computer devices 100 generally include, inter alia, a processor 102, data storage devices such as non-volatile memory 104, data communications components 108 (e.g., ports for a modem, modems, or other types of network interfaces etc.), display screens 110 (e.g., CRT, LCD display, etc.), and an input component 112. The input component 112 may be a keypad, or, a screen which further includes input software to receive written information from a pen or another device. It is envisioned that attached to the small mobile computer device 100 may be other devices such as a mouse pointing device, read only memory (ROM), a video card, bus interface, printers, etc. Those skilled in the art will recognize that any combination of the above components, or any number of different components, peripherals, and other devices, may be used with the small mobile device 100.

The small mobile computer device 100 operates under the control of an operating system (OS) 116, such as Palm OS or Windows CE. The operating system 116 is booted into the non-volatile memory 104 of the small mobile computer device 100 for execution when the small mobile computer device 100 is powered-on or reset. In turn, the operating system 116 then controls the execution of one or more computer programs 118. These computer programs 118 typically include application programs 119 which aid the user in utilizing the small mobile computer device 100. These application programs 119 include, inter alia, e-mail software, software for storing addresses and phone numbers, word processors, and other application programs which the user of a small mobile computer device 100 would find useful. The present invention is generally implemented in these computer programs 118, which are executed under the control of the operating system 116, and cause the small mobile computer device 100 to perform the desired functions as described herein. Alternatively, the present invention may be implemented in the operating system 116 itself In particular, the present invention is typically implemented using a local database 120, which may be a relational database management system (RDBMS), such as the DB2® Everywhere product sold by IBM Corporation, although it may be implemented with any database management system (DBMS) software.

The local database 120 utilizing RDBMS software receives commands from users for performing various search and retrieval functions, termed queries, against one or more databases stored in non-volatile memory 104. In the preferred embodiment, these queries conform to the Structured Query Language (SQL) standard, although other types of queries could also be used without departing from the scope of the invention. The queries invoke functions performed by the RDBMS software of the local database 120, such as definition, access control, interpretation, compilation, database retrieval, and update of user and system data. The RDBMS software of the local database 120 invokes the modification system 122.

The modification system 122 is implemented by computer programs 118 and works in conjunction with the application programs 119. The application programs 119 modify data in the local database 120 and the modification system 122 tracks whether the changes are either "local" or "global." Further, synchronization software 124 is connected to the local database 120 and the modification system 122 to control the transmission of data, via a data link 126, from the local database 120 to a main database 128 located on another computer 130. The operation of the synchronization process will be discussed in more detail later. The computer programs 118 include the synchronization software 124 and the modification system 122.

The computer programs 118 are comprised of instructions which, when read and executed by the small mobile computer device 100, causes the small mobile computer device 100 to perform the steps necessary to implement and/or use the present invention Generally, the operating system 116 and/or computer programs 118 are tangibly embodied in and/or readable from a device, carrier, or media, such as non-volatile memory 104, and/or data communications devices 108. Under control of the operating system 116, the computer programs 118 may be loaded from the non-volatile memory 104, auxiliary data storage devices, and/or data communications devices 108 into the non-volatile memory 104 of the small mobile computer device 100 for use during actual operations.

Thus, the present invention may be implemented as a method, apparatus, or article of manufacture using standard programming and/or engineering techniques to produce software, firmware, hardware, or any combination thereof The term "article of manufacture" (or alternatively, "computer program product") as used herein is intended to encompass a computer program accessible from any computer-readable device, carrier, or media. Of course, those skilled in the art will recognize many modifications may be made to this configuration without departing from the scope of the present invention.

Those skilled in the art will recognize that the exemplary environment illustrated in FIG. 1 is not intended to limit the present invention. Indeed, those skilled in the art will recognize that other alternative hardware environments may be used without departing from the scope of the present invention.

A Modification System for Supporting Localized Data Changes

In accordance with the present invention, a user may execute a change to data in the local database 120 of the small mobile computer device 100. In a database, a table is assigned to a table space. A table space contains one or more datasets. In this way, the data from a table is assigned to storage within non-volatile memory 104 or in an auxiliary storage device. A table space can be a system managed space (e.g., an operating system file system) or a database managed space. A change may be performed by the small mobile computer device 100 to modify a data record in the local database 120, which is stored within a data storage device, such as non-volatile memory 104, or an auxiliary storage device. The modification system 122 marks the change as being either "local" or "global." When the local database 120 on the small mobile computer device 100 is synchronized, utilizing the synchronization software 124 and the data link 126, with a main database 128 of another computer 130, the modification system 122 transmits only "global changes" from the local database 120 to the main database 128.

The modification system 122 of the present invention supports "local changes," i.e. the localized update, deletion, and insertion of data stored within the local database 120 of a small mobile computer device 100. The modification system 122 also supports "global changes," in which, all updates, deletions, and insertions of data stored within the local database 120 are recognized by the synchronization software 124, during the synchronization process, and are transmitted utilizing the data link 126 to a main database 128 on another computer 130 where they are recorded.

In conventional systems, the data of the small mobile computer device 100 and the main database 128, are always "globally changed," i.e., reconciled with one another during the synchronization process such that they always contain the same data. Unfortunately, this unnecessarily increases the amount of data transmitted back and forth during the synchronization process resulting in a slow, inefficient, and expensive synchronization process.

On the contrary, "local changes" implemented by the modification system 122 of the present invention allow data to be deleted, updated, or inserted in the local database 120, and during the synchronization process, these deletions and changes are not recognized by the synchronization software 124, and are not transmitted via the data link 126 to the main database 128 on another computer 130. Therefore, these changes are not recorded by the main database 128. Thus, the data is not reconciled and the local database on the small mobile computer device 100 can have different data than that of the main database 128.

The modification system 122 of the present invention allows an application program 119 to automatically, or via user selection, select "global changes" for the deleting or updating of data, which is recognized by the synchronization software 124 during the synchronization process and is recorded at the main database, or, "local changes" for the deleting or updating of data, which is not recognized by the synchronization software 124 during the synchronization process, and is therefore not recorded at the main database 128.

For example, due to the small display and limited memory of a small mobile computer device 100, a user may want to make a "local change" to delete some records in the local database 120 of his small mobile computer device 100 which the user does not need access to. This allows the user to easily locate needed records, without having to browse through a lot of unnecessary records and saves space within the limited non-volatile memory 104 of the small mobile computer device 100. Further, a user may want to make some changes to the data on the small mobile computer device 100, such as specialized notes about a potential buyer, that do not need to be reflected at the main database 128. As previously discussed, with conventional systems, all of these changes (deletions/updates/insertions) would be "global" changes and would be involved in the synchronization process, resulting in a slow, inefficient, and expensive synchronization process.

With the modification system 122 of the present invention, these changes can be designated as "local" and will not be involved in the synchronization process resulting in an optimized and efficient synchronization process. There are many different types of approaches that would be apparent to one of ordinary skill in the art that can be utilized to mark changes and deletions to data stored in a small mobile computer device 100 to indicate that they are "local" changes and should not be involved in the synchronization process. The following approaches are only examples.

A first approach, approach 1, is useful for dirty-bit based data management systems that associate dirty bits for each data record that is modified. The dirty bits typically include two bits for designating four different states that indicate the type of modification performed on the data record: insert/delete/clean/update. Under the first approach, the modification system 122 of the present invention allows an application program 119 to automatically, or via user selection, select "global changes" for the deleting/updating/insertion of a data record, in which the dirty bit is automatically set to indicate the type modification, or, "local changes" for deleting/updating/insertion of a data record, in which the dirty bit is not set and is transparent to the synchronization software. Thus, "local changes" are not involved in the synchronization process and are not transmitted to or recorded by the main database 128. In particular, the modification system 122 enables a user or the application program 119 to identify changes as "local," in which case, the modification system ensures that the dirty bit associated with the changed records is not set.

Figure 2:
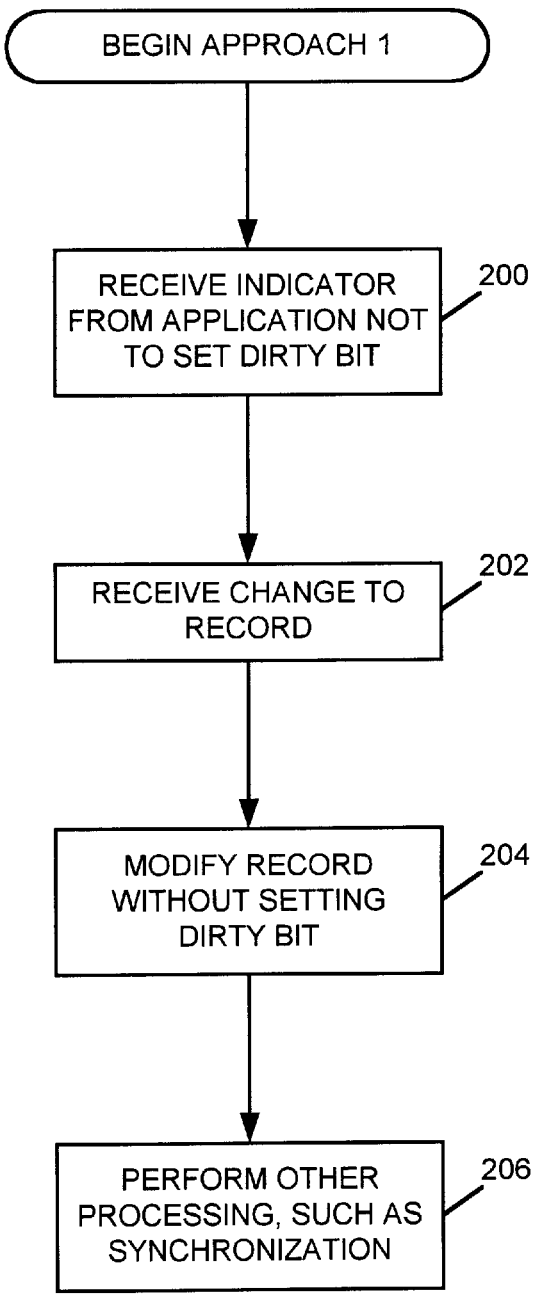
FIG. 2 is a flow diagram that illustrates the steps performed by a modification system to modify a record without setting a dirty bit.

FIG. 2 is a flow diagram illustrating the steps performed by the modification system 122 to modify a data record without setting a dirty bit indicating that the change to the data record should be a "local" change. In block 200, the modification system 122 receives an indicator from the application program 119 not to set the dirty bit. After the data record has been changed, block 202, the modification system 122 continues to block 204 and modifies the data record without setting the dirty bit. For example, if the data record is updated or deleted, the dirty bit will remain clean and will not be set as being updated or deleted. Afterwards, block 206, other processing, such as synchronization processing, may be performed. When the synchronization process is performed, the dirty bit is not set and the modification to the data record is not recognized by the synchronization software 124 and is not transmitted to, nor recorded at, the main database 128. Thus, the change is a "local" change.

The modification system 122 also supports other useful functions when utilized with dirty-bit based data management systems. The modification system 122 allows the application program 119 to select data records based upon the status of the dirty bit. For example, the application program 119 can choose data records based upon whether they have been recently updated or not.

Another approach, approach 2, that can be utilized with a dirty-bit based data management system, involves utilizing another bit added to the existing two dirty bits, referred to as the location bit. In addition to the original dirty bits designating the four different modification types: insert/delete/clean/update, the location bit is added to the data record to designate whether the data record modification is to be: "local" or "global." When the application program 119 or the user indicates a change is to be "local," the modification system 122 sets the location bit to "local." Alternatively, when the application program 119 or the user indicates a change is to be "global," the modification system 122 sets the location bit to "global."

Figure 3:
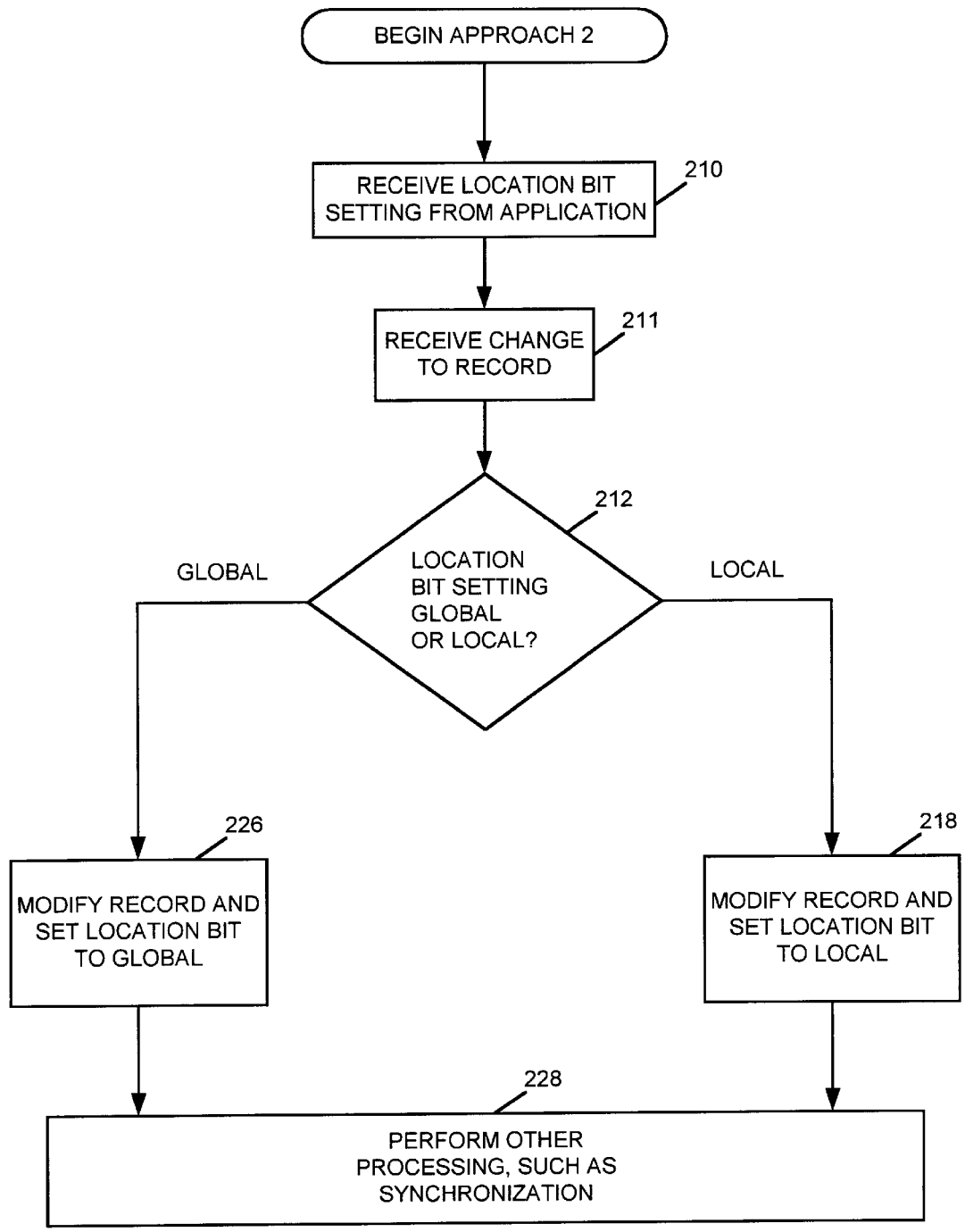
FIG. 3 is a flow diagram that illustrates the steps performed by the modification system to modify a record and to set a location bit indicating whether the change is a local change or a global change.

FIG. 3 is a flow diagram that illustrates the steps performed by the modification system 122 to modify a data record and to set a location bit indicating whether the modification is a "local" change or a "global" change. In block 210, the modification system 122 receives a location bit setting from the application program 119. In block 211, the modification system 122 receives a change to the data record. In block 212, the modification system 122 determines whether the location bit setting is global or local. When the location bit setting is local, the modification system 122 continues to block 218 to modify the record and to set the location bit to local. Afterwards, block 228, other processing, such as synchronization processing, may be performed. Thus, when the synchronization process is performed, the synchronization software 124 determines that the change to the data record is a "local" change and ignores it. Accordingly, the change will not be transmitted to, nor recorded at, the main database 128. A "local" delete is sometimes termed a "soft delete."

On the other hand, when the modification system 122 determines that the location bit setting is global, in block 212, the modification system 122 continues to block 226 to modify the record and to set the location bit to global. Afterwards, block 228, other processing, such as synchronization processing, may be performed. Thus, when the synchronization process is performed, the synchronization software 124 determines that the change to the data record is a "global" change and registers it. Accordingly, the change will be transmitted to, and recorded at, the main database 128.

The modification system 122 also provides a "hard delete" function by allowing the application program 119 to physically remove the whole data record, including the associated dirty bits, such that deletion will be "local," as there is no data record, nor dirty bits, for the synchronization software 124 to recognize and transmit. Therefore, the deletion is "local" to the small mobile computer device 100.

Another approach, approach 3, is useful for log based data management systems that record all data changes in a log file. The modification system 122 of the present invention allows the application program 119 to automatically, or via user selection, select whether or not to log "local" changes.

Figure 4:
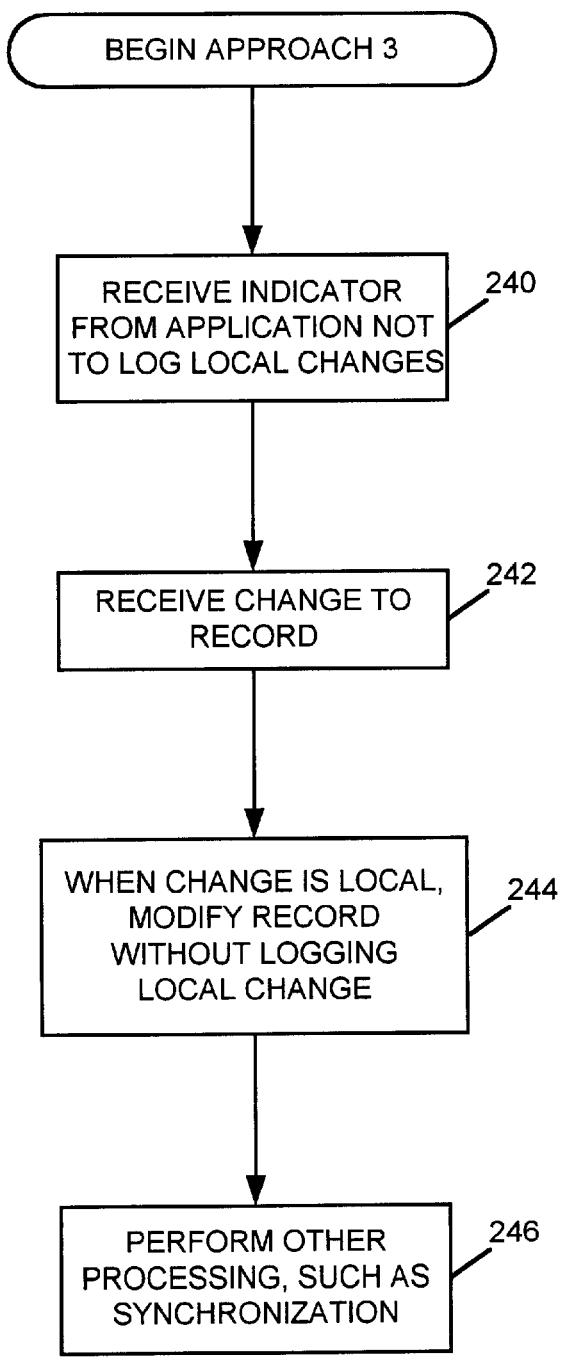
FIG. 4 is a flow diagram that illustrates the steps performed by the modification system to modify a record without logging local changes.

FIG. 4 is a flow diagram that illustrates the steps performed by the modification system 112 to modify a record without logging "local" changes. In block 240, the modification system 122 receives an indicator from the application program 119 not to log local changes. After the data record has been changed, block 242, the modification system 122 continues to block 244 and, when the change is local, modifies the record without logging the local change. Afterwards, block 246, other processing, such as synchronization processing, may be performed. Thus, when the synchronization process is performed, a log file reflecting the change to the data record does not exist. Therefore, the change is not recognized by the synchronization software 124 and is not transmitted to, nor recorded at, the main database 128 such that the change is a "local" change.

Another approach, approach 4, is also useful for log based data management systems that record all data changes in a log file. In addition to logging all the operations performed over the data records, approach 4 also includes an extra location identifier for each log file to designate whether the log modification is to be: "local" or "global." When an application program 119 or a user indicates that a change is "local," the modification system 112 sets the location identifier to "local." Alternatively, when the application program 119 or the user indicates a change is to be "global," the modification system 122 sets the location bit to "global."

Figure 5:
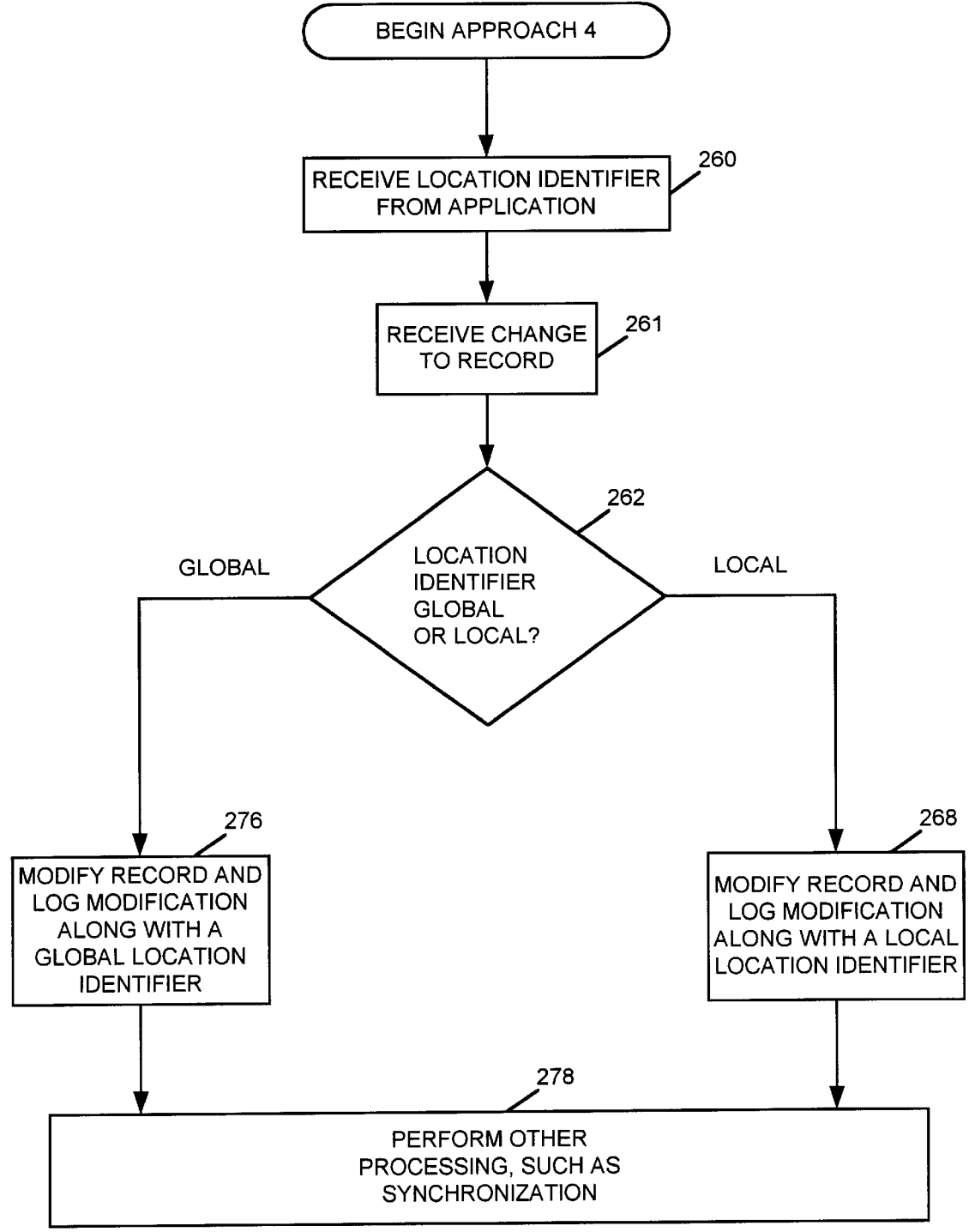
FIG. 5 is a flow diagram that illustrates the steps performed by the modification system to modify a record and to log the modification along with a local or global location identifier.

FIG. 5 is a flow diagram that illustrates the steps performed by the modification system 122 to modify a data record and to log the modification along with a local or global location identifier. In block 260, the modification system 122 receives a location identifier from the application program 119. In block 261, the modification system 122 receives the change to the data record. In block 262, the modification system 122 determines whether the location identifier is global or local. When the location identifier is local, the modification system 122 continues to block 268 to modify the record and logs the modification to the log file along with a local location identifier. Afterwards, block 278, other processing, such as synchronization processing, may be performed. Thus, when the synchronization process is performed, the synchronization software 124 determines that the change to the log file is a "local" change and ignores it. Accordingly, the changes to the log file will not be transmitted to, nor recorded at, the main database 128.

On the other hand, when the modification system 122 determines that the location identifier setting is global, in block 262, the modification system 122 continues to block 276 to modify the record and logs the modification to the log file along with a global location identifier. Afterwards, block 278, other processing, such as synchronization processing, may be performed. Thus, when the synchronization process is performed, the synchronization software 124 determines that the change to the log file is a "global" change and registers it. Accordingly, the changes to the log file will be transmitted to, and recorded at, the main database 128.

Although the above-described approaches have been described in association with data records, it should be appreciated that these approaches can also be utilized with larger or smaller data sets.

Typically, when a user is done using the small mobile computer device 100 in stand-alone mode, the user connects to a main database 128 located on another computer 130 to download or upload information. Oftentimes, the small mobile computer device 100 may be connected to a computer network via another computer, which is in turn, connected to the computer 130 having the main database 128. Alternatively, the small mobile computer device 100 may communicate with the main database 128, via a data communication device 108, included within the small mobile computer device 100, or, contained within another computer to which the small mobile computer device 100 is connected. Once the synchronization process is initiated, the synchronization software 124 determines which changes to the data records have been marked as "local," and ignores them, and which changes to the data records have been marked as "global," and transmits them via the data link 126 to the main database 128 on another computer 130 where they are recorded.

The modification system 122, in conjunction with the synchronization software 124, performs a synchronization process, in which, the synchronization software 124 only transmits global changes to the main database 128, as instructed by the modification system 122, when the small mobile computer device 100 connects to the main database 128. Under approach 1, the synchronization software 124 determines whether any data records have a set dirty bit and, as instructed by the modification system 122, transmits those data records to the main database 128. Under approach 2, the synchronization software 124 determines whether any data records have a location bit set to global and, as instructed by the modification system 122, transmits those data records to the main database 128. Under approach 3, the synchronization software 124 determines whether any logged changes to data records exist and, as instructed by the modification system 122, transmits them to the main database 128. Under approach 4, the synchronization software 124 determines whether any logged changes to data records exist having a global location identifier and, as instructed by the modification system 122, transmits them to the main database 128.

Although the example above was directed to a small mobile computer device with a modification system for differentiating between "local" and "global" data record changes and transmitting the "global" changes to a main database, one skilled in the art would recognize that the modification system of the present invention could be used for other types of computers, such as personal computers or mainframes, to communicate with a wide variety of other different types of computers. Additionally, in an alternative embodiment, a user could specify a wide variety of different types of data flags to differentiate between "local" and "global" changes.

Conclusion

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of localizing changes in a computer, the method comprising:

executing a change to data in a computer having a local database, the change being performed by the computer to modify data in the local database stored within a data storage device at the computer;

indicating, on the computer, whether the change is a global change; and when the local database on the computer is synchronized with a main database on another computer, transmitting only global changes from the local database to the main database and not transmitting local changes.

2. The method of claim 1 above, wherein the computer is a mobile device.

3. The method of claim 1 above, wherein the indicating further comprises not setting a dirty bit associated with the change.

4. The method of claim 3 above, wherein the change is a local change.

5. The method of claim 1 above, further comprising selecting data based upon the status of a dirty bit.

6. The method of claim 1 above, wherein the indicating further comprises setting a location bit to indicate whether the change is a local change or a global change.

7. The method of claim 6 above, further comprising receiving the location bit setting indicating whether the change is to be a local change or a global change.

8. The method of claim 6 above, wherein the location bit is an additional bit that is added to a group of dirty bits.

9. The method of claim 6 above, wherein setting the location bit comprises a soft delete.

10. The method of claim 1 above, further comprising performing a hard delete to physically remove a whole data record.

11. The method of claim 1 above, wherein the indicating further comprises not logging the change.

12. The method of claim 11 above, wherein the change is a local change.

13. The method of claim 1 above, wherein the indicating further comprises logging the change along with a location identifier.

14. The method of claim 13 above, further comprising receiving a location identifier indicating whether the change is to be a local change or a global change.

15. An apparatus for localizing changes, comprising:

a computer having a data storage device that stores a local database; and one or more computer programs, performed by the computer, for executing a change to data in the computer, the change being performed by the computer to modify data in the local database, for indicating, on the computer, whether the change is a global change or a local change, and, for, when the local database on the computer is synchronized with a main database on another computer, transmitting only global changes from the local database to the main database and not transmitting local changes.

16. The apparatus of claim 15 above, wherein the computer is a mobile device.

17. The apparatus of claim 15 above, wherein means for indicating further comprises means for not setting a dirty bit associated with the change.

18. The apparatus of claim 17 above, further comprising means for receiving an indicator indicating that the change is to be a local change.

19. The apparatus of claim 15 above, further comprising means for selecting data based upon the status of a dirty bit.

20. The apparatus of claim 15 above, wherein means for indicating further comprises means far setting a location bit to indicate whether the change is a local change or a global change.

21. The apparatus of claim 20 above, further comprising means for receiving a location bit setting indicating whether the change is to be a local change or a global change.

22. The apparatus of claim 20 above, wherein the location bit is an additional bit that is added to a group of dirty bits.

23. The apparatus of claim 20 above, wherein setting the location bit comprises a soft delete.

24. The method of claim 15 above, further comprising means for performing a hard delete to physically remove a whole data record.

25. The apparatus of claim 15 above, wherein means for indicating further comprises means for not logging the change.

26. The apparatus of claim 25 above, further comprising means for receiving an indicator indicating that the change is to be a local change.

27. The apparatus of claim 15 above, wherein means for indicating further comprises means for logging the change along with a location identifier.

28. The apparatus of claim 27 above, further comprising means for receiving a location identifier indicating whether the change is to be a local change or a global change.

29. An article of manufacture comprising a computer program carrier readable by a computer and embodying one or more instructions executable by the computer to perform a method for localizing a change, the method comprising executing a change to data in a computer having a local database, the change being performed by the computer to modify data in the local database stored within a data storage device at the computer;

indicating, on the computer, whether the change is a global change or a local change; and when the local database on the computer is synchronized with a main database on another computer, transmitting only global changes from the local database to the main database and not transmitting local changes.

30. The article of manufacture of claim 29 above, wherein the computer is a mobile device.

31. The article of manufacture of claim 29 above, wherein the indicating further comprises not setting a dirty bit associated with the change.

32. The article of manufacture of claim 31 above, wherein the method further comprises receiving an indicator indicating that the change is to be a local change.

33. The article of manufacture of claim 29 above, wherein the method further comprises selecting data based upon the status of a dirty bit.

34. The article of manufacture of claim 29 above, wherein the indicating further comprises setting a location bit to indicate whether the change is a local change or a global change.

35. The article of manufacture of claim 34 above, wherein the method further comprises receiving a location bit setting indicating whether the change is to be a local change or a global change.

36. The article of manufacture of claim 34 above, wherein the location bit is an additional bit that is added to a group of dirty bits.

37. The article of manufacture of claim 34 above, wherein setting the location bit comprises a soft delete.

38. The article of manufacture of claim 29 above, wherein the method further comprises performing a hard delete to physically remove a whole data record.

39. The article of manufacture of claim 29 above, wherein the indicating further comprises not logging the change.

40. The article of manufacture of claim 39 above, wherein the method further comprises receiving an indicator indicating that the change is to be a local change.

41. The article of manufacture of claim 29 above, wherein the indicating further comprises logging the change along with a location identifier.

42. The article of manufacture of claim 41 above, wherein the method further comprises receiving a location identifier indicating whether the change is to be a local change or a global change.

* * * * *